Patented Mar. 9, 1943

2,313,138

UNITED STATES PATENT OFFICE 2,313,138

PRODUCTION OF COLOR PHOTOGRAPHIC IMAGES

Alfred Fröhlich and Wilhelm Schneider, Dessau, Germany, assignors to General Aniline & Film Corporation, New York, N. Y., a corporation of Delaware No Drawing. Application November 18, 1941, Serial No. 419,569. In Germany July 31, 1940

10 Claims. (Cl. 95—6)

Our present invention relates to the production of color photographic images, and more particularly to new dyestuff components for the color forming development.

In the production of photographic dyestuff images it is known to use dyestuff components capable of forming dyestuffs with a developing substance. The dyestuff components may be added either to the solution of the developer or already have been incorporated in the silver halide emulsion layers. For the production of multicolor images by using photographic multi-layer materials containing non-diffusing dyestuff formers in the layers. It is of special importance to adjust the tints of the single colors images so as to fulfill the theoretical requirements of the subtractive three color process as completely as possible. Especially favorable spectral properties of the dyestuffs produced from the dyestuff formers are required for the negative-positive-process. Chiefly a good transmission of the blue dyestuffs in the green and blue regions of the spectrum is necessary. Dyestuff formers which yield blue dyestuffs having a good transmission in the green and blue regions of the spectrum are known. It has, for instance, been proposed to halogenate phenols and naphthols capable of coupling. This method, however, has the disadvantage that the sensitivity especially of the naphthols is much decreased by such halogenation. Sometimes it is therefore impossible as, for instance, with the known pentabromonaphthol to obtain a sufficient concentration of the dyestuff former in the developer. Moreover, it has been proposed to use phenols having nitrogenous 6-membered nuclei fused thereon such as hydroxyquinolines instead of naphthols. However, it has turned out that the color tone of the dyes obtained by these hydroxy quinolines are hardly different from the analogous dyes derived from naphthols so that it is generally immaterial for practical purposes if α-naphthols or the corresponding hydroxy quinolines are employed. It is furthermore known that hydroxy compounds consisting of three nuclei as, for instance 1-hydroxy-anthracene yield blue-green dyestuffs having a strongly green tone. This compound, however, is useless due to its extremely high sensitivity to air. Developers containing such dyestuff formers become black in a short time when exposed to air. Hydroxyphenanthrenes capable of coupling which would likewise yield green tints cannot, however, be used practically since they have not been prepared as yet in a sufficient amount.

It has now been found that the hydroxyazaphenanthrenes and the derivatives thereof are very useful as dyestuff formers which yield blue-green dyestuffs having a good transmission in the blue and green ranges of the spectrum.

For the purposes of color photography all hydroxyazaphenanthrenes are suitable which possess a hydroxy group with unsubstituted p-position or the p-position to the hydroxy group of which is substituted by a halogen or an acid radicle. A useful hydroxyazaphenanthrene is, for instance, the following compound:

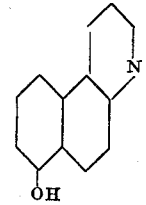

Valuable derivatives are, for instance, the following acids:

Hydroxy-azaphenanthrenecarboxylic acids, obtained by reacting carbon dioxide on the sodium compound of hydroxy-azaphenanthrene, hydroxy-azaphenanthrenesulfonic acids produced by sulfonating hydroxy-azaphenanthrene, and methylhydroxy-azaphenanthrene prepared analogous to the known synthesis of quinaldine, for instance by reacting 2-aminonaphthalene-5-sulfonic acid with paraldehyde in concentrated hydrochloric acid and subsequently substituting a hydroxy group for the sulfo group by means of a potash fusion.

Since the substitution of the hydroxy-azaphenanthrenes can easily be carried out they are especially suitable for the introduction of substituents which impart fastness to diffusion with respect to the binding agent to the dyestuff former or render variations of the color tone of the resulting dyestuff possible. Thus the hydroxy-azaphenanthrenecarboxylic acid of the formula:

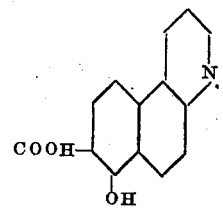

may, for instance, react with amines which are capable of producing fastness to diffusion as, for instance, with alkylamines having a relatively high molecular weight such as dodecylamine or natural or synthetic hydroaromatic amines as, for instance, abietyl amines or perhydroaromatic amines as, for instance, abietinyl amines or perhydroaminodiphenyl. It is easily possible in this reaction to modify the fastness to diffusion, the color tone of the dyestuffs to be formed, the gradation of the dyestuff image and the color yield of the dyestuff formers by means of the introduction of substituents in the same manner as known with α-hydroxynaphthoic acid. As substituents producing fastness to diffusion the radicles described in the "Photographische Korrespondenz" 1938, page 21 and 1939, page 106 may for instance be employed. Moreover it is possible to introduce groups capable of rendering the dyestuff former soluble in water such as sulfo, carboxyl or hydroxy groups into the molecule thereof. When the dyestuff formers fast to diffusion do not possess a sufficient water-solubility they may be incorporated into the silver halide emulsion by dispersing agents as, for instance, described in U. S. P. 2,186,717 of January 9, 1940, and U. S. patent application Ser. No. 401,676 filed July 9, 1941

For the production of color images the dyestuff formers of the present invention may be added to a color developer or a silver halide emulsion. The emulsions may be cast to form a single layer or worked up into a photographic multilayer material. The other layers may also contain dyestuff formers which are adapted to produce a dyestuff image in another way. The layers may be arranged on one or both sides of the support, if desired in conjunction with filter-, intermediate-, and anti-halation layers. The color images may be produced by a simple or reversal development as a negative or positive, respectively.

The following examples illustrate the invention but they are not intended to be limiting.

*Example 1*

An exposed silver halide gelatin emulsion layer is developed in a color developer of the following composition:

Solution *a*:
  Diethyl-p-phenylene diamine_____ g__ 1
  Sodium carbonate_____ g__ 20
  Water _____ cc__ 1000

Solution *b*:
  Hydroxy-azaphenanthrene sodium _g__ 1
  Water _____ cc__ 100 for about 10 minutes the solutions *a* and *b* being mixed before use. After dissolving out the developed silver and fixing one obtains a blue dyestuff image.

*Example 2*

A solution of 10 g. of sodium-8-hydroxy-azaphenanthrene-7-carboxylic-acid-dodecylamide-5-sulfonate in 100 cc. of water is added to 1 kg. of a silver halide emulsion and cast to form a layer in the usual manner. On exposure and development with a soda alkaline solution of p-diethylaminoaniline a blue dyestuff image is obtained in situ with the silver image.

We claim:

1. In a process of producing color photographic images by color forming development, the improvement which comprises developing an exposed photographic silver halide gelatine emulsion with an aromatic primary amino developer containing as a dyestuff former hydroxy-aza-phenanthrene.

2. Silver halide gelatin emulsion for color photography containing as a color forming development component a hydroxy-aza-phenanthrene, said compound containing a radicle imparting thereto fastness to diffusion with respect to said binding agent of said emulsion.

3. A color forming developer, comprising an aqueous solution containing an aromatic primary amino developing agent and a hydroxy-aza-phenanthrene.

4. In a process of producing color photographic images by color forming development, the improvement which comprises developing an exposed silver halide gelatine emulsion with an aromatic primary amino developer in the presence of a hydroxy-aza-phenanthrene as a dyestuff former.

5. The process as defined in claim 1 wherein the hydroxy-azo-phenanthrene color former is located in the silver halide gelatine emulsion.

6. The process as defined in claim 4, wherein the hydroxy-aza-phenanthrene is located in the silver halide gelatine emulsion and contains a radical imparting thereto fastness to diffusion with respect to the gelatine.

7. A silver halide gelatine emulsion for color photography containing as a color forming development component a hydroxy-aza-phenanthrene.

8. A silver halide gelatine emulsion for color photography containing as a color forming development component a hydroxy-aza-phenanthrene in which the carbon atom in p-position to the hydroxy group is substituted by a member of the class consisting of hydrogen, halogen and acid radicals.

9. The composition defined in claim 8 wherein the hydroxy-aza-phenanthrene contains a radical imparting thereto fastness to diffusion with respect to the gelatine.

10. A color forming developer as defined in claim 3, wherein the carbon atom in p-position to the hydroxy group of the hydroxy-aza-phenanthrene is substituted by a member selected from the class consisting of hydrogen, halogen and acid radicals.

ALFRED FRÖHLICH.
WILHELM SCHNEIDER.